United States Patent [19]

Sytsma

[11] 3,971,601

[45] July 27, 1976

[54] SANITARY ANTI-FRICTION TROLLEY WHEEL

[75] Inventor: Frederick R. Sytsma, Grand Rapids, Mich.

[73] Assignee: C. L. Frost & Son, Inc., Grand Rapids, Mich.

[22] Filed: Dec. 2, 1974

[21] Appl. No.: 528,794

[52] U.S. Cl. ..................... 308/16; 16/98; 16/107; 104/95; 105/154; 198/177 R; 308/191

[51] Int. Cl.² ................. B65G 17/20; F16C 13/06; F16C 19/16; F16C 25/06

[58] Field of Search .............. 16/98, 107; 104/95; 105/148, 154; 198/177 R; 308/16, 191, 195

[56] References Cited
UNITED STATES PATENTS

| 874,367 | 12/1907 | Moore | 105/154 |
|---|---|---|---|
| 1,093,348 | 4/1914 | Mooers | 308/195 |
| 1,571,334 | 2/1926 | Howard | 16/98 |
| 1,737,360 | 11/1929 | Disbro | 16/107 |
| 2,076,239 | 4/1937 | Lemmon | 308/190 |
| 2,780,178 | 2/1957 | Zebley | 105/148 |
| 3,231,067 | 1/1966 | Gaboury et al. | 198/177 R |
| 3,268,062 | 8/1966 | Gladstone | 104/95 X |
| 3,360,314 | 12/1967 | DiLoreto | 308/191 X |
| 3,469,892 | 9/1969 | Langstroth | 308;16/191 X;98 X |
| 3,503,659 | 3/1970 | Boylan | 308/16 |
| 3,590,744 | 7/1971 | Galloway et al. | 104/172 C |
| 3,724,387 | 4/1973 | Civitarese | 16/98 X |
| 3,787,925 | 1/1974 | Dawson | 16/107 |

FOREIGN PATENTS OR APPLICATIONS

| 674,966 | 10/1929 | France | 16/98 |
|---|---|---|---|
| 851,284 | 10/1952 | Germany | 308/191 |
| 621,857 | 4/1949 | United Kingdom | 308/191 |

*Primary Examiner*—Albert J. Makay
*Assistant Examiner*—Howard Beltran
*Attorney, Agent, or Firm*—Price, Heneveld, Huizenga & Cooper

[57] ABSTRACT

A trolley wheel is formed of plastic-like material and includes a bearing assembly, inner and outer metallic races and bearing means positioned therebetween. The entire assembly is formed of non-corrosive material. The bearing means and races therefore are accessible from the sides of the wheel for ease of cleaning during operation.

18 Claims, 4 Drawing Figures

SANITARY ANTI-FRICTION TROLLEY WHEEL

BACKGROUND OF THE INVENTION

I. Field of Invention

This invention relates to a trolley wheel in general, and in particular, a unique plastic wheel assembly particularly adapted for utilization in sanitary environments.

II. Description of the Prior Art

Overhead conveyor trolleys are used in numerous applications in manufacturing and fabrication plants as well as in food processing plants or other types of installations such as hospitals or the like where sanitation and noncorrosive properties are critical. In many food processing installations, food or other sanitation sensitive items are carried by the overhead conveyor and the conveyors are many times passed through a steam bath or the like each time the conveyor makes a circuit. In many cases, the conveyor is apt to be exposed to elements such as heat and moisture or detergents which would quickly cause rust or other types of deterioration if conventional conveyor assemblies were utilized. Another type of deterioration in such a system would be loss of lubrication when the conveyor is passed through the cleaning process.

The conventional overhead conveyor wheel is a ball bearing supported conveyor which utilizes a trolley wheel riding in or on a track and is connected to a bracket which has a chain engaging portion. The chain is driven by a conventional power means and the load is suspended from the bracket. Conventional prior art conveyors utilize metal wheels which are subject to corrosion and the bearings require frequent lubrication. If these type of prior art conveyors are used in a sanitary environment, that is subjected to steam baths etc. the lubrication is destroyed and corrosion problems are encountered such as the wheels tend to wear severely at the bearing. This results in problems of the system "binding up" causing rapid flaking or peeling of metal material which results from metal-on-metal contact. Thus the system deteriorates quickly with adverse side effects. On the other hand if additional lubrication is applied to overcome this problem, the system is not "sanitary" since the lubrication drops into the articles (such as food) being conveyed. While plated trolleys work for a while, the plating eventually wears. All stainless steel parts on the other hand are too expensive.

In order to overcome many of the disadvantages of the conventional metal trolley, it has been considered to provide a plastic trolley wheel which will withstand deterioration from exposure to heat and moisture. Ideally, utilization of plastic would also provide a quieter system which is desirable in most installations. Plastic wheels of a sort, of course, have been known in such installations as a suspended shower door movable in its own plane along plastic rollers connected to the top and movable in a track. One type is illustrated in Langstroth, U.S. Pat. No. 3,469,892, which utilizes a plastic wheel and bearing assembly, the peripheral portion of the wheel or opening being formed to provide an outer race for the ball bearing. These types of prior art proposals, of course, do not take into consideration situations where the loads are significant nor are they really directed toward situations where sanitation itself is that significant.

Attempts have been made to provide a load bearing plastic trolley assembly in situations where the loading is more substantial. A more recent representation of such teaching is that illustrated in Dawson, U.S. Pat. No. 3,787,925. These types of installations however have not really operated as well as expected. A particular difficulty is that these types of plastic wheels do not utilize a rolling element bearing mechanism. While a very high density wheel material is utilized, so that it is load supporting, the utilization of a journal bearing construction has continued to create a variety of problems. To begin with, in a journal bearing arrangement where the wheel rides on a journal or freely rotates about a stud, high start up torque results. Further, the speed of operation is limited since as the speed builds up, the heat builds up thereby increasing the wear. Such types of wheels have also experienced flat spots internally near the journal and when this occurs, not only does the wheel tend to bind up, resulting flat spots will occur on the outer surface portion of the wheel due to the resultant eccentric rotation. As soon as flats are experienced, increased flaking of the material is experienced which is extremely disadvantageous in sanitary environments utilizing food or the like. A further disadvantage has been a tendency to squeak in operation requiring mineral oil lubrication which further deteriorates rapidly in installations utilizing a process for cleaning the conveyor system. The journal bearing system is not self-cleaning and deposits caused from flaking or ingestion of foreign material decreases the efficiency and operation.

The prior art to date has found that high density ultra high molecular weight polyethylene (UHMW) has proven to be most desirable where plastic trolley wheels are utilized. This is particularly true in sanitary or non-corrosive applications.

If the higher density range is not utilized, then the wear, particularly at the bearing area is too great. UHMW polyethylene in the higher density range however, is considerably more expensive than that in the lower density range and is not subject to injection molding. Thus, not only is the material cost higher, it requires machining which greatly adds to the overall cost of the trolley wheel assembly.

Yet another drawback to journal bearing plastic wheel trolleys is the high start up torque involved. This requires not only increased wear but also a power supply larger than desired. Thus, although it has been recognized that there are advantages to utilizing a plastic trolley wheel in a load bearing conveyor assembly, there is a need in this art for an improved arrangement which permits high speed operation at low torque start up utilizing a conveyor wheel not subject to rust and which truly does not need periodic lubrication and in fact is self-cleaning. In addition, there is a need to provide a plastic trolley wheel arrangement providing longer service life at an economically feasible price.

SUMMARY OF THE INVENTION

In accordance with the present invention, an anti-friction plastic wheel is utilized in combination with a bearing assembly comprising inner and outer races with an anti-friction means provided between the races. An annular outer metallic race is positioned in the central opening of the plastic wheel as is an inner metallic bearing race with a plurality of anti-friction means disposed in the space between the races.

In narrower aspects of the invention, the plastic wheel is comprised of an injection moldable grade of material, preferably ultra high molecular weight polyethylene material. Further, the inner race is formed in part by a stud having an enlarged head portion formed to provide at least a portion of the inner race, the stud being directly attached to the trolley bracket. In a double row ball bearing arrangement, a cylindrical sleeve or spacer member slips over the stud and forms the other inner race portion.

In the preferred embodiment, a trolley assembly is provided which is particularly adapted for use in a sanitary environment and includes a pair of annular outer bearing races formed of stainless steel inserted from each side into the central opening of the trolley wheel, the races being spaced axially apart and a set of roller balls being provided for each of the races. The inner race assembly includes a shaft with an enlarged head on one end forming one of the inner races as set forth above and a cylindrical member fitting over the shaft to form the other inner race, both inner races being comprised of stainless steel as well as the set of ball bearings for each race. A stamped stainless steel bracket is provided to which the trolley wheel is directly connected providing a completely noncorrodible assembly of stainless steel and plastic. The ball bearings are positioned to the outside faces of the wheel on each side as much as possible to expose same for easy cleaning and preferably, the ball bearings extend laterally beyond the plane of the outer race portions making them particularly effective for cleaning. In this fashion, the preferred stainless steel assembly is self-cleaning since it is easily flushed while at the same time it is self-lubricating since the stainless steel balls are actually lubricated by the cleaning fluid such as water.

The unique ball bearing mechanism provided in the preferred embodiment greatly reduces wear and start up torque as well as eliminating any problem with flat spots since the bearing pressure is taken up through the balls over the entire axial width of the inner and outer races. The self-cleaning nature of the assembly keeps the raceways clean preventing anything other than the absolute minimum particle dispersement caused by metal-on-metal contact.

In a narrower aspect of the invention, the opposite end of the axle from the enlarged head is threaded and has diametric flats formed for insertion into a similarly configurated opening in the bracket so that when the axle shaft is attached to the bracket by a nut, the inner race is physically prevented from rotation. Additionally, the stamped stainless steel bracket in addition to the wheel supporting end has a chain engaging portion. The bracket has upraised edges with the chain engaging portion having a flat plate portion and interrupted portions along the upraised edges aligned for receipt of the body portion of chain link when the bracket is inserted within a chain link. The chain engaging portion further includes means offset from the flat plate portion intermediate the raised edge portions providing additional support pads for the chain link alleviating support concentration at the support shoulders.

The novel bearing assembly with its lowered wear and start up torque permits utilizaton of ultra high molecular weight polyethylene material in the lower density range which is economically more advantageous than anything heretofore known. In addition, it permits injection molding of the wheel which greatly reduces the cost of fabrication of the wheel. Thus, a completely unique trolley bracket assembly is provided, particularly adapted for utilization in sanitary or non-corrodible environments.

DESCRIPTION OF THE PREFERRED EMBODIMENT

Figure 1:
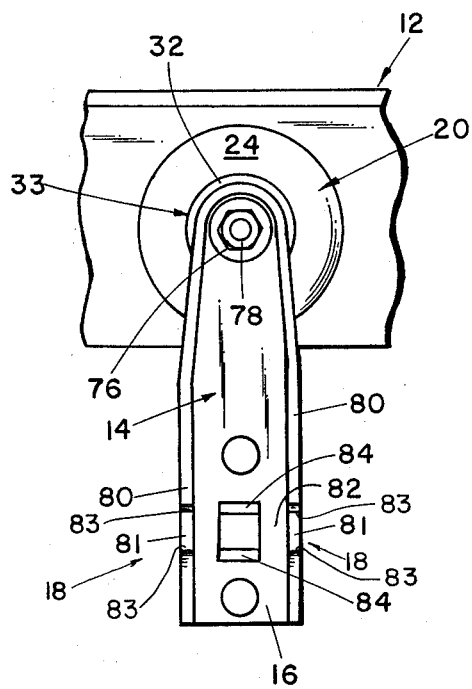
FIG. 1 is a side view of a trolley wheel and bracket assembly in accordance with the present invention.

Referring now to the drawings, a trolley assembly 10 is suspended from an I-beam 12 by a pair of identical trolley brackets 14. The trolley assembly is powered in a conventional manner by a chain (not shown) attached to a lower portion 16 of brackets 14 in chain receiving and engaging portions 18. The lower portion of the bracket, the attachment therebetween, and the chain receiving and engaging portion are described in detail in a commonly assigned, co-pending application of Frederick R. Sytsma and Siegfried K. Weis, Ser. No. 506,303 filed Sept. 16, 1974 entitled TROLLEY BRACKET AND METHOD FOR MAKING SAME, now abandoned, which application is incorporated herein by reference.

Figure 2:
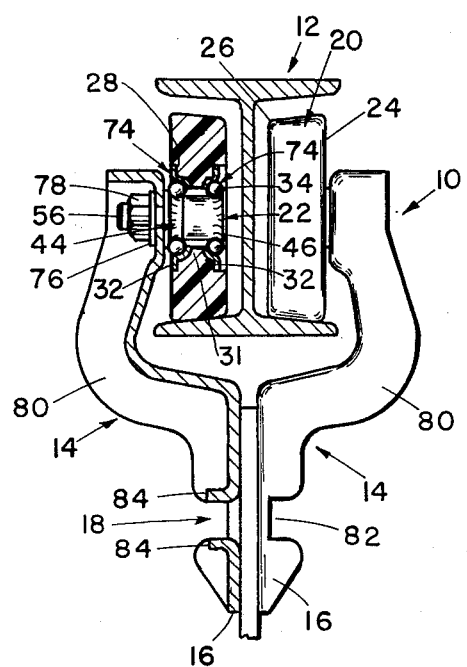
FIG. 2 is an end view in partial cross section of the assembly in FIG. 1.
Figure 3:
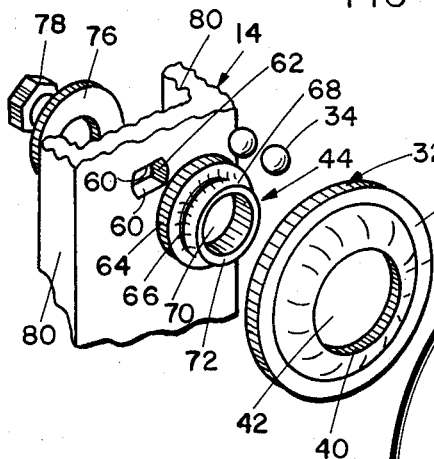
FIG. 3 is an exploded view of the invention.

With reference to FIGS. 2 and 3, trolley wheel 20 is formed from a plastic-like material and includes a central axial opening 21 through which an axially extending shaft 22 is provided for rotatably mounting the wheel as will be hereinafter described. The inner and outer radial faces 24 and 26 of wheel 20 are each provided with annular recesses or shoulders 28 and 30 respectively surrounding the central axial opening 21. The recesses form a seat for a pair of identical metallic race elements 32 to support a plurality of anti-friction bearing elements as ball bearings 34. The race elements 32 form the outer races for the bearing assembly and the axially extending shaft 22 forms the inner race as will be hereinafter described.

Outer race elements 32 are formed with a radial flange 36 which curves inwardly forming a curved surface 38 extending radially inwardly forming a flange 40 which defines a central opening 42. The curved surface 38 is generally complementary to the contour of ball bearings 34. Curved surface 38 supports the ball bearing elements 34 on their outer portions and inner facing side portions where they are held in place by inner race elements formed on shaft 22 to be hereinafter described. The shoulders 28 and 30 of wheel 20 are joined together by a configurated peripheral portion 31 which provides axial support between outer race elements 32 as shown in FIG. 2.

Figure 4:
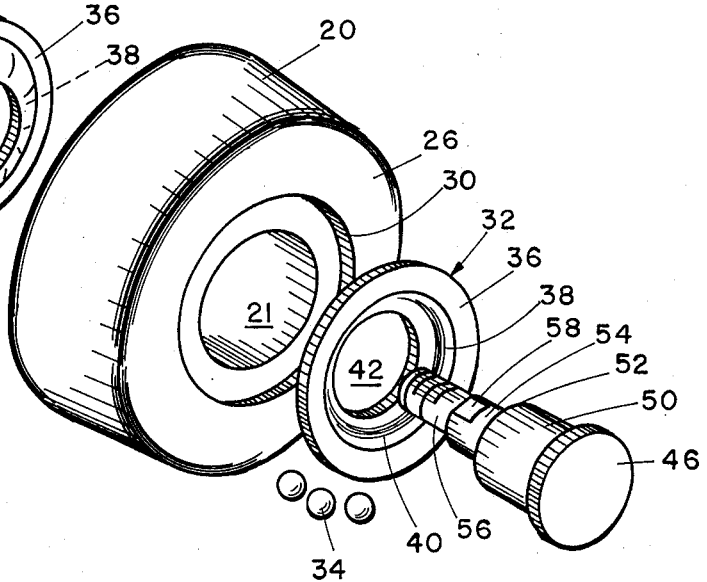
FIG. 4 is an enlarged cross-sectional view of the shaft and inner race assembly.

The inner race elements (FIG. 4) are partially formed as an integral part of shaft 22 and additionally by means of a conically-shaped spacer element 44 connected together in the completed bearing assembly. Shaft 22 includes an enlarged outer head portion 46 which tapers inwardly at a convex curved section 48 to a cylindrical shank portion 50. Curved section 48 is complementary to the contour of the bearings 34 having the same radius of curvature as the curved surface 38 of outer race elements 32 to support the inner and side portions of bearings 34.

Cylindrical shank portion 50 extends partially along the length of shaft 22 and terminates in an inwardly directed shoulder 52. A stud portion 54 extends axially from shoulder 52 and is threaded at its outermost end 56. A complementary pair of flat machined face surfaces 58 are provided at opposite sides of stud portion 54 and are adapted to engage corresponding flat surfaces 60 formed in an opening 62 in brackets 14 when assembled.

The second set of bearing races is formed adjacent the inner radial face 24 of wheel 20 by means of conically-shaped spacer element 44. Spacer 44 includes a first enlarged outer diameter portion 64 and a curved concave surface 66 extending to a cylindrical shoulder 68 of reduced diameter corresponding generally to the cylindrical shank 50 formed on shaft 22. Spacer 44 includes an axial opening 70 corresponding generally to the diameter of stud 54 for positioning thereover such that the end 72 of spacer 44 may be positioned in abutting relationship with shoulder 52 on shaft 22. Curved concave surface 66 is complementary to the surface of bearings 34 and has the same radius of curvature as the curved surface 38 of outer race elements 32 and curved section 48 or shaft 22.

When assembled as shown in FIG. 2, it will be noted that in the double row bearing embodiment illustrated, bearing elements 34 are partially exposed and accessible at the inner and outer radial faces 24 and 26 of the wheel. Bearings 34 at inner face 24 are positioned between curved surface 66 of spacer 44 and the curved surface 38 of outer race 32. Similarly, bearings 34 adjacent outer face 26 of wheel 20 are positioned between curved surface 38 of outer race 32 and the curved section 48 formed between the head 46 and shank 52 of shaft 22. A gap 74 is thus provided between the inner and outer race elements such that bearing elements 34 are slightly offset from the radial flanges 36 of the outer race elements so that bearing elements 34 extend laterally slightly beyond the plane of the radial flange 36 of the outer race. This offset aids in effective cleaning of the assembly as it is passed through a steam bath or the like wherein with each cycle of cleaning, dirt and other contaminates are completely and thoroughly washed from within the wheel and the bearing elements and the water itself serves as an effective lubricant.

Wheel 20, shaft 22, outer race elements 32 and spacer 44 are secured to brackets 14 by passing the threaded end 56 of shaft 22 through opening 62 in the bracket such that the machined faces 58 formed on the stud portion 54 are in alignment and with flats 60 formed in opening 62. A washer 76 and a nut 78 received on threaded portion 54 of shaft 22 completes the assembly and securely locks the inner race in position. When the shaft 22 is thus secured to brackets 14 the flats 60 formed in opening 62 and faces 56 on shaft 22 physically prevent rotation of shaft 22 and the inner race formed therewith. A rivet pin or other fastener mechanism could also be substituted for nut 78.

Bracket 14 shown in FIGS. 1 and 2 is formed with the previously described chain engaging portion 18 formed at its lower end 16. Bracket 14, preferably a stainless steel stamping, includes raised peripheral edge portions 80 which contribute to the strength and rigidity of the bracket. Edges 80 are interrupted at 81 forming shoulders 83 to allow passage of and support of a chain link (not shown) therethrough. The flat plate portion 82 of the brackets are interrupted intermediate shoulder 83 forming a pair of outwardly extending pad-like members 84 which form a saddle to retain the sides of a chain link as described in the above mentioned application Ser. No. 506,303.

In a preferred embodiment of the invention, wheel 22 is comprised of an injection moldable grade of material. Preferably wheel 22 is molded from ultra high molecular weight polyethylene (UHMW PE) in the lower density range, the lower density range being from about 0.910 to about 0.925 g./cu.cm. The lower density range material is particularly desirable since such materials readily lend themselves to injection molding to thereby greatly reduce the cost of fabrication. In addition the ultra high molecular weight polyethylene material has chemical resistance, toughness and self-lubricating characteristics which are particularly desirable in a sanitary conveyor application. Preferably, the component portions including brackets 14, inner and outer races 32, shaft 22, nut 78, washer 76 and bearing elements 34 are formed of stainless steel material such that the complete assembly is positively non-corrodible thereby lending itself ideally for utilization in sanitary environments.

As contrasted to trolley wheel arrangements of the prior art, the novel bearing arrangement of the present invention greatly reduces the start up torque required and additionally eliminates problems with respect to excessive bearing wear during use, since the bearing pressure is equally distributed through the rolling elements over the inner and outer races. In addition, the self-cleaning nature of the assembly during passage through a steam cleaning or other bath positively keeps the inner and outer raceways clean thereby preventing such damage. The novel assembly of the invention allows the utilization of ultra high molecular weight polyethylene material in the lower density range to thereby permit the injection molding of the wheel assembly greatly reducing the cost of fabrication.

Those skilled in the art will of course, readily appreciate the many advantages of the present invention over that shown in the prior art. Those so skilled will also recognize that many modifications may be made and it is intended that the equivalent arrangements be covered unless the following claims by their wording expressly state otherwise.

The embodiments of the invention in which an exclusive property or privilege is claimed are defined as follows:

1. A trolley wheel assembly comprising, in combination: an anti-friction plastic wheel having a central opening; an annular outer metallic bearing race positioned in said opening; an axial means extending through said opening; an annular inner metallic bearing race positioned about said axial means and spaced from said outer race; and a plurality of anti-friction means disposed in said space defined between said races; said axial means including a shaft having an enlarged head portion, said head portion having a formed surface comprising at least a part of said inner race; said inner race further including a second member, said second member being cylindrical and adapted to fit over said shaft and into abutment with said enlarged head portion of said shaft, the outer surface of said second member comprising at least a portion of said inner race.

2. The combination of claim 1 wherein said outer bearing race, said axial means, said inner bearing race and said anti-friction means are formed of stainless steel.

3. The combination of claim 1 wherein said wheel is comprised of an injection moldable polyethylene material.

4. The combination of claim 3 wherein said material comprises ultra high molecular weight polyethylene in the low density range, such that said assembly can bear large loads.

5. The combination of claim 1 and further including a bracket member, said bracket member having means formed therein to receive said shaft, and means on said shaft and said bracket for fixing said shaft to said bracket.

6. The combination of claim 5 wherein said receiving means includes said bracket having a configured non-circular opening formed therethrough to receive said shaft, said shaft having a portion thereon formed to correspond to said configured opening in said bracket for locking engagement therewith.

7. The assembly of claim 6 wherein said bracket is formed of stainless steel.

8. The assembly of claim 5 wherein said bracket includes a wheel supporting end and a chain engaging portion remote from said wheel supporting end, said bracket having upraised edges; said chain engaging portion having a flat plate portion and interrupted portions along said edges aligned for receipt of the body portion of a chain link, said interrupted portions forming chain engaging shoulders.

9. The assembly of claim 8 wherein said flat plate portion is also interrupted intermediate said edges forming chain engaging pads alleviating wear at said shoulders.

10. The combination of claim 1 wherein said antifriction means extends outwardly beyond the radial plane of the outer bearing race.

11. A trolley bracket assembly comprising, in combination: a trolley bracket having a trolley wheel supporting end, said end having an opening for receiving a trolley wheel; a trolley wheel comprising an anti-friction plastic wheel with a central opening; a pair of metallic annular outer bearing races in said central opening, said races being spaced axially apart; a set of roller balls for each of said races; an inner race assembly including a mounting shaft having an enlarged head on one end, the opposite end of said shaft adapted for insertion into said bracket opening for securing said trolley wheel to said bracket, said enlarged head including an inner race for one of said set of balls; and a cylindrical member adapted to fit over said shaft into abutment with said enlarged head, said cylindrical member including an inner race for the other of said set of balls.

12. The combination of claim 1 wherein said wheel is comprised of an injection moldable polyethylene material.

13. The combination of claim 12 wherein said material comprises ultra high molecular weight polyethylene in the low density range, such that said assembly can bear large loads.

14. The bracket assembly of claim 12 and further including locking means formed in said opening in said wheel supporting end and on said opposite end of said shaft for positively fixing said shaft to said bracket.

15. The bracket assembly of claim 14 wherein said locking means includes said opening having at least one edge portion thereof defining a flat surface and a corresponding flat surface formed on said opposite end of said shaft.

16. The assembly of claim 15 wherein said bracket is formed of stainless steel.

17. The assembly of claim 16 wherein said shaft, said outer bearing races, said roller balls and said cylindrical member are formed of stainless steel.

18. The assembly of claim 11 wherein said roller balls extend outwardly beyond the radial plane of said outer race.

* * * * *

UNITED STATES PATENT AND TRADEMARK OFFICE
CERTIFICATE OF CORRECTION

PATENT NO. : 3,971,601
DATED : July 27, 1976
INVENTOR(S) : FREDERICK R. SYTSMA

It is certified that error appears in the above–identified patent and that said Letters Patent are hereby corrected as shown below:

Column 8, Line 14:

Claim 12 of patent should be dependent on Claim 11;

Signed and Sealed this

Seventh Day of November 1978

[SEAL]

Attest:

RUTH C. MASON
Attesting Officer

DONALD W. BANNER
Commissioner of Patents and Trademarks